Patented Feb. 20, 1940

2,190,991

UNITED STATES PATENT OFFICE 2,190,991

METHOD OF CONCENTRATING CITRUS FRUIT JUICES

Gotthold Harry Meinzer, Glendale, Calif., assignor to California Consumers Corporation, Los Angeles, Calif., a corporation of California No Drawing. Application August 15, 1938, Serial No. 225,047

3 Claims. (Cl. 99—155)

The invention pertains to the art of concentrating fruit juices by heat evaporation and has for its object to produce a citrus fruit juice concentrated to a relatively small volume and capable of being rediluted to yield an exact replica of the original juice as to color, taste, flavor, and aroma.

It is well known to concentrate fruit juices by heating, but it is also known that the juices of the citrus fruits cannot be concentrated in this manner and then rediluted to the original consistency without suffering severe depreciation, the flavor and aroma of the diluted concentrate being very different from those of the original juice and distinctly unpleasant to most consumers.

It is also known to separate certain fruit juices, by centrifuging, into a liquid portion and a portion consisting partially of solids, to evaporate water from the liquid portion, and to recombine the partly solid portion with the concentrated liquid, thus obtaining a concentrate containing all the constituents of the original juice except for a reduced proportion of water. This method of concentration, utilizing a centrifuging step and evaporating the liquid fraction, is described in a recently issued United States patent, in which the process is specifically described as applied to tomato juice. As the process is disclosed, the juice is first strained to remove seeds and other detritus and is then centrifuged with a force equal to 1,500 times gravity; the aqueous liquid taken from the centrifuge is concentrated by heat, and the concentrate is mixed with the "meat solids" collecting in the centrifuge bowl. This mixture must be pasteurized if it is to be kept, either during or after this mixing step. Pasteurization is applied to stabilize the meat solids, which have not previously been heated.

When this method is applied to the juice of any of the citrus fruits, a very indifferent result is obtained, certain serious difficulties developing which are peculiar to the juices of this type of fruit, and the object of the present invention is to improve on the method of the said patent in adapting it specifically to the manipulation of the citrus fruit juices.

The difficulties encountered in the application of the above method to the citrus juices are manifested as follows:

(a) The coloring, flavoring, and aromatic constituents of the citrus juices, found in the fraction which collects in the bowl of the centrifuge and which will hereinafter be referred to as "the chromatophores", are extremely unstable to even gentle heating. Heat changes and severely depreciates the flavor and aroma, and this instability is such that the application of the pasteurizing step to the chromatophore fraction or to the blend in which it finally appears is wholly inadmissible.

(b) As the chromatophore fraction has very poor "keeping" properties and as it cannot be stabilized by heat, other methods must be found for preserving it until used.

(c) The unpleasant flavor developed by heating the chromatophores is so marked that the presence of traces even of these bodies in the liquid fraction subjected to heat concentration is sufficient to destroy the value of the final product. The last traces of these bodies cannot be removed from the liquid fraction by centrifuging, and other methods must be found for their complete removal.

(d) The chromatophores occur in the juice in a state of very fine dispersion and, as the available specific gravity difference is small, the centrifugal effect specified in the prior patent is sufficient to separate only a small part of the total quantity present in the juice. The chromatophores are the characterizing and therefore the most valuable constituent of the juice. It is necessary, in order to avoid the loss of these values, to apply a much higher centrifugal effect than that previously disclosed.

The citrus fruits are sharply distinguished from the other fruits of which I have knowledge in the manner of occurrence of the coloring, flavoring, and aromatic constituents in the juice. In the generality of fruits, these substances are largely if not entirely water soluble and appear largely or entirely in the clarified aqueous liquid of the juice, from which they cannot be removed by mechanical steps such as centrifuging or filtration.

The chromatophores of the citrus juices, on the contrary, are wholly insoluble in water and are present in the fruit in the form of minute particles or globules adhering to the walls of the cells or sacs in which the juice is retained. So complete is this insolubility that if the juice be removed from the fruit without dislodging the chromatophore particles (as, for example, by pricking the individual cells or even by very gentle squeezing of the fruit) the liquid obtained is a simple solution of citric acid and sugars, has a sweet-sour taste and is totally devoid of the flavor and aroma characteristic of the particular fruit from which it was obtained. The juices obtained in this manner from oranges, lemons, limes, and grape-fruit are identical except as to variations in acid and sugar content and have no flavor or aroma by which they can be distinguished.

The manner in which these insoluble substances pass into and become part of the juice is also characteristic of the citrus fruits. In the reaming process by which it is customary to extract the juice from these fruits the cell walls are broken down into fragments of varying size, from scales easily visible to the naked eye to such as are resolved only under a strong lens. Some of the chromatophore particles, usually the greater portion, remain attached to these scales, but some are dislodged. The entire aggregate of scales and chromatophore particles passes into suspension in the aqueous portion of the juice, to which it imparts color, flavor, and aroma. It will be understood that the chromatophore particles themselves are of extremely minute dimensions, approaching the colloidal. The fact that an insoluble substance can impart flavor to the suspending aqueous liquid is probably due to the intimate subdivision of the particles.

The weight relation of the chromatophore particles to the cellulosic wall material has an important bearing on the effect produced by centrifuging. The chromatophores themselves have a specific gravity approximately equal to or slightly less than that of water. The cell wall scales of themselves have a materially greater specific weight. On increasing the gravity difference by centrifuging, the larger scales, or those having the smaller proportion of adhering chromatophores, are separated readily. The smaller scales and those having a greater proportion of adherent chromatophores are separated more slowly and only with the application of a greater centrifugal force. Such particles as have become detached from the cell walls have no gravity difference to be magnified by centrifugal force and cannot be separated in this manner, regardless of the force applied or the time of centrifugation.

At the 1,500 times gravity recommended in the prior patent only the larger cellulosic fragments, carrying a variable but relatively small proportion of the total chromatophore content, can be thrown out. At about ten times this force, or 15,000 times gravity, the maximum separation possible to the centrifuge may be obtained. The required time may be shortened by going to high centrifugal speeds, such as 20,000 times gravity or more, but the yield is not thereby increased. On the other hand the maximum separation cannot be obtained with a force much below 15,000 times gravity, even with much extended time. As the result of long continued experiment I have come to the belief that this figure of about 15,000 times gravity is critical for the separation and recovery of the maximum quantity of the highly valuable chromatophores. As will appear, such of these bodies as pass into the liquid effluent from the centrifuge must later be removed in a manner which results in their loss.

The chromatophores are fatty or fat-like substances (lipoids), soluble in alcohol, ether, and other organic solvents and insoluble in water. On heating they are progressively converted into other substances lacking the original flavor and aroma, thus causing these characteristics to disappear and the juice to become flat and insipid. Further, the conversion products consist of or contain certain amino-acids which have a decidedly unpleasant flavor. A very small proportion of these secondary products has a highly adverse effect on the palatability of the juice.

This conversion of chromatophores is very marked at even the minimum time-temperature conditions required for stabilization by pasteurizing, and it follows that this step cannot be applied to the chromatophores, no matter what their environment. That is to say, pasteurization cannot be applied, without disastrous effects on the flavor and aroma, to the juice itself, nor to the chromatophores as separated from the juice by centrifuging, nor to the blend of the chromatophores with the concentrate from the aqueous liquid (this blend being the "concentrate" of commerce).

Further, the deleterious effect of the conversion products is so marked that the aqueous fraction from the centrifuge must completely be deprived of such chromatophores as escape separation in the centrifuging step before this fraction is concentrated by heating. The unpleasant flavor imparted to the concentrate by the conversion of chromatophores is qualitative rather than quantitative and is produced if even a very small quantity of the unstable substance is present during the heating of the liquid fraction. The aqueous liquid, prior to heat concentration, must be crystal clear, a condition to which it cannot be brought by the action of the centrifuge.

In endeavoring to avoid the depreciation of flavor which attached to the presence of residual chromatophores in the aqueous fraction during concentration, I have discovered that these bodies may be removed completely by the addition to the liquid of a small quantity of a diatomaceous earth filter-aid, followed by filtration through a closely woven cloth. This separation may also be effected, though less advantageously, with the use of other solid absorbents or clarifying agents, or even by filtering through paper or blotter without the use of a filter-aid. The latter alternative is not particularly practical as the cellulosic scales of wall material and the gummy particles of chromatophore substance rapidly choke the pores of a filter unless some sort of filter-aid be used. In the use of diatomaceous earth a small dose of the filter-aid, for example of the order of one to two per cent by weight, is usually sufficient, though with earths of different effectiveness this dosage may be varied considerably. Filtration will be accelerated by applying a thin precoat of water-suspended filter-aid to the cloth or other filtering medium.

The chromatophores thus removed from the liquid are entrained in the filter-aid cake or in the pores of the filtering medium, from which they cannot be removed in any useful form by means now known to me. Being alcohol soluble they may be recovered by washing the cake and evaporating off the solvent, but in this process they suffer so severely by oxidation as to be useless. Because they are practically irrecoverable, and because they are highly valuable as being the very essence of the fruit juice, the quantity of chromatophores allowed to remain in the effluent from the centrifuge should be reduced to the lowest possible terms.

The aqueous liquid, when wholly deprived of chromatophores, is entirely stable to heat up to the temperature at which the vitamins begin to be altered. Any desired concentration of the aqueous liquid may therefore be produced by boiling down at such diminished pressure and consequently diminished temperature as suffices to preserve the vitamin content intact. If the preservation of the vitamins is not considered essential, boiling may be conducted at atmospheric pressure. In any case the temperature must be high enough to sterilize the evaporating liquid.

Having segregated the greatest possible proportion of the chromatophore content of the juice in the centrifuging operation and having removed the last traces of these bodies from the aqueous fraction which is to be heat concentrated, it remains to find means for preserving the chromatophore fraction until it is blended with the concentrated aqueous fraction, and for preserving this blend after it is made, bearing in mind that any application of heat for this purpose is inadmissible.

The juice as it exists in the whole fruit contains the enzymes which assist or produce ripening but is sterile. During or after its removal from the fruit it inevitably becomes nonsterile by contamination with everywhere present bacteria, yeast spores, mold spores, etc. Such portion of these organisms as occur in the aqueous liquid are, of course, destroyed by the heat used in the concentrating step, and the concentrated liquid portion is sterile, but such as occur in the chromatophore fraction remain active during any storage period and are carried into the final blend.

I have discovered that the blend may be protected against fermentation and molding in the packages by evaporating the aqueous liquid to a syrupy consistency, so as to contain not less than about seventy per cent by weight of total solids. The blend of such proportion of chromatophores as is requisite to impart the desired flavor with this syrupy concentrate is stable so long as undiluted and protected from oxidation. It is not sterile, but the growth of bacteria and spores is inhibited by the high concentration of sugar in the blend, and the bursting of packages which often follows the packing of nonsterile products is entirely avoided. The concentration above stated is based on the assumption that the chromatophore fraction is deprived of as much of the aqueous liquid as can be separated with ordinary care.

This step, while highly useful and valuable for the described purpose, does not provide for the preservation of the chromatophore fraction until it is used in making the final blend, nor does it provide a blended product free from bacteria, which are objectionable on general principles and may chance to be pathogenic.

The first definiciency may be remedied by sufficient refrigeration of the chromatophore fraction until used, thus retarding the development of bacteria and spores and preventing fermentation. It may also be corrected, at least in greater part, by accumulating an advance supply of the concentrated aqueous liquid, which will keep indefinitely, and blending the chromatophore fraction immediately or very shortly after it is received from the centrifuge.

A more desirable alternative, which not only ensures the keeping quality of the chromatophore fraction but also provides a completely sterile blend, is to apply to the chromatophore fraction, preferably immediately after it is separated, the chemical sterilization method described, and claimed for fruit juices broadly, in my copending application Serial No. 225,048, filed of even date herewith and entitled "Method of sterilizing fruit juices."

This method, in so far as it is applicable to the sterilization of the separated chromatophore fraction, consists in introducing elementary chlorine into the pulpy fraction and, after it has performed its sterilizing function, removing any excess by strongly evacuating the mass. The chlorine may be introduced in the gaseous form, in minute bubbles or streams and with such degree of agitation as to effect its thorough dissemination throughout the semiliquid mass, or the mass may be placed in a rotatable closed vessel having its free space occupied by gaseous chlorine, the vessel then being rotated until all parts of the mass have been contacted with the gas.

It is preferable, however, to introduce the chlorine in the form of a hypochlorite of an alkali metal, e. g., sodium hypochlorite. This salt yields free chlorine in the highly reactive nascent form and leaves a residue of sodium chloride, a normal constituent of citrus juices. The quantity used varies with the acidity of the chromatophore fraction, but is extremely small in any case.

In cases where the acidity of the chromatophore fraction is low, I have found that a considerable economy of chlorine may be realized and the vitamin C content of the fraction preserved by bringing the chromatophores to a hydrogen ion concentration of about pH 2.91 prior to the application of chlorine. This is readily accomplished by the addition of a fruit acid, preferably citric acid. In this manner the dosage of chlorine required by the chromatophore fraction of orange juice may be reduced from 500 parts per million or over to 100 parts or less. The sour juices, such as lemon juice, normally have an acidity greater than that expressed by pH 2.91 and are not benefited by the addition of acid.

No matter how the chlorine be applied, the final step in the treatment is to expose the treated fraction, preferably in thin moving layers, to a low subatmospheric pressure, by which any free chlorine remaining may be removed completely. This treatment causes no change in the flavor or aroma of the chromatophore fraction but ensures its complete stability, if excluded from contact with air, and the stability of the blend into which it finally enters.

The entire treatment, including acidification if any, chlorination, and removal of excess chlorine, should be performed in the cold in order to restrain oxidation of the chromatophores. On no account should the temperature be allowed to rise above 80° Fahr. and I prefer to work at 60° Fahr. or even below.

Considering all of the above conditions, I find that to prepare a citrus fruit juice "concentrate" having, when rediluted, a flavor and aroma equal to and identical with that of the fresh juice, it is necessary to follow the procedure outlined below:

1. Ream the unpeeled fruit to obtain a rough juice. Peeled fruit may be ground, if preferred, but this alternative cannot be applied to unpeeled fruit as this would result in contamination of the juice with rind wax and with rind oil, an essential oil which oxidizes to a bitter terpene;

2. Strain the rough juice to remove seeds, rag, fragments of albedo and other inert substances. Do not carry this straining step to such point as to obstruct the free passage into the liquid of the small fragments of cell wall material. The strained juice should be free from any large pieces of rag or albedo but should be decidedly cloudy in appearance;

3. Centrifuge the strained juice at about 15,000 times gravity, or above, and set aside the pasty yellow or orange mass of chromatophores and cell wall material which collects in the bowl. This mass will contain a variable proportion of the aqueous liquid and, for the reasons above given, this proportion should be held down so far as is feasible;

4. Separate the remaining traces of chromatophores from the aqueous liquid by filtration, preferably with the use of the diatomaceous earth filter-aid above described;

5. Concentrate the clarified filtrate by heating and evaporation until the residue contains about 70% or more of total solids, by weight. If the chromatophores have been sterilized by chemical means, as in step 6c below, a less concentrated aqueous fraction may be used;

6a. Utilize the chromatophore fraction in the blending step (7) as soon as it is separated from the juice, or 6b. Maintain the chromatophore fraction under strong refrigeration until so used, or, preferably, 6c. Sterilize the chromatophore fraction by the chemical method above described;

7. Blend the liquid fraction concentrated in step 5 with the chromatophore fraction obtained in step 3. The proportion of chromatophores to acids and sugars in the blend may be the same as that existing in the original juice, or may be greater or less in case it is desired to modify the "body" of the juice away from that originally existing. The ability to modify the body in this manner, by merely proportioning the two constituents, provides a ready and effective means for standardizing the quality of the product against changes in fruit quality during the season.

The blending operation should be performed by mechanical stirring, avoiding oxidizing conditions so far as possible, and at substantially atmospheric temperature. It is repeated that the chromatophores should not be heated at any time, either before, during, or after blending with the evaporation residue.

The advantages attendant on following the above procedure, in its various modifications, may be enumerated as follows:

(a) In all modifications, the blend or final product may be rediluted to exactly duplicate and reproduce the original juice in all its characteristics: color, taste, flavor, and aroma. It may, if desired, be varied away from the original juice as regards body, but in so doing the freshness of flavor is in no wise impaired.

(b) In the modification in which the aqueous fraction is concentrated to 70% solids or over and the chromatophores are treated in the manner of alternatives 6a or 6b, the packaged product, from which air is excluded, will keep indefinitely at ordinary temperatures. After the package is opened the contents will keep long enough to permit their entire consumption, at any ordinary rate, if kept cool.

(c) In the modification in which the aqueous fraction is concentrated to 70% solids or less and the chromatophores are treated in the manner of alternative 6c, the advantages recited under "b" above will be realized and, additionally, the blend will be sterile and will remain so, even after opening the package, so long as the contents are protected against a second contamination.

Where "atmospheric" temperature is recited in this specification or in the claims, the term will be understood to mean the maximum atmospheric temperature obtaining in the locality in which the operation is conducted.

I claim as my invention:

1. The method of concentrating citrus fruit juices which comprises, centrifuging a previously strained citrus fruit juice to separate a chromatophore fraction from an aqueous fraction, said chromatophore fraction containing substantially all of the chromatophores adherent to other insoluble solid material, filtering out the last traces of chromatophores from said liquid fraction, thereafter evaporating water from said liquid fraction at a temperature sufficiently high to produce sterilization thereof, and blending the residue from said evaporating step with said chromatophore fraction in desired proportions at a temperature not substantially above atmospheric, whereby to avoid the slightest heating of the chromatophore fraction.

2. The method of concentrating citrus fruit juices which comprises, centrifuging a previously strained citrus fruit juice to separate a chromatophore fraction from an aqueous fraction, said chromatophore fraction containing substantially all of the chromatophores adherent to other solid insoluble material, filtering out the last traces of chromatophores from said liquid fraction, thereafter evaporating water from said liquid fraction at a temperature sufficiently high to produce sterilization thereof, continuing said evaporation until said liquid fraction contains not less than about 70% by weight of total solids and blending the residue from said evaporating step with said chromatophore fraction in desired proportions at a temperature not substantially above atmospheric, whereby to avoid the slightest heating of the chromatophore fraction while protecting the blend against fermentation by the high sugar concentration.

3. The method of concentrating citrus fruit juices which comprises, centrifuging a previously strained citrus fruit juice at not substantially less than 15,000 times gravity to separate a chromatophore fraction from an aqueous fraction, said chromatophore fraction containing substantially all of the chromatophores adherent to other solid insoluble material, filtering the last traces of chromatophores from said liquid fraction, thereafter evaporating water from said liquid fraction at a temperature sufficiently high to produce sterilization thereof, and blending the residue from said evaporating step with said chromatophore fraction in desired proportions at a temperature not substantially above atmospheric, whereby to preserve the taste of the fresh fruit juice by avoiding the slightest heating of the chromatophores.

GOTTHOLD HARRY MEINZER.